US008329256B2

(12) United States Patent
Pawlik et al.

(10) Patent No.: US 8,329,256 B2
(45) Date of Patent: Dec. 11, 2012

(54) METHOD AND DEVICE FOR THE PRODUCTION OF MOULDED PIECES FROM A LAYER OF POLYURETHANE

(75) Inventors: Wolfgang Pawlik, Cologne (DE); Dominik Obeloer, Korschbroich (DE); Ingo Kleba, Aachen (DE)

(73) Assignee: Hennecke GmbH, Leverkusen (DE)

( * ) Notice: Subject to any disclaimer, the term of this patent is extended or adjusted under 35 U.S.C. 154(b) by 511 days.

(21) Appl. No.: 12/594,463

(22) PCT Filed: Apr. 3, 2008

(86) PCT No.: PCT/EP2008/002635
§ 371 (c)(1),
(2), (4) Date: Oct. 2, 2009

(87) PCT Pub. No.: WO2008/122400
PCT Pub. Date: Oct. 16, 2008

(65) Prior Publication Data
US 2010/0112217 A1 May 6, 2010

(30) Foreign Application Priority Data
Apr. 5, 2007 (DE) ......................... 10 2007 016 785

(51) Int. Cl.
*C23C 16/14* (2006.01)
(52) U.S. Cl. ..................................... 427/427.4; 366/107
(58) Field of Classification Search ............... 427/427.4; 366/107
See application file for complete search history.

(56) References Cited

U.S. PATENT DOCUMENTS

| | | | | |
|---|---|---|---|---|
| 3,226,036 A * | 12/1965 | Grahn | ........................... | 239/400 |
| 4,019,720 A * | 4/1977 | Levesque et al. | ............... | 366/96 |
| 4,261,196 A * | 4/1981 | Scheid, Jr. | ..................... | 73/32 R |
| 2005/0133610 A1* | 6/2005 | Cowelchuk et al. | .............. | 239/1 |

* cited by examiner

*Primary Examiner* — Timothy Meeks
*Assistant Examiner* — Nathan T Leong
(74) *Attorney, Agent, or Firm* — Lucas & Mercanti, LLP

(57) ABSTRACT

The invention relates to a process and a device for the production of mouldings containing a layer of polyurethane in shot operation, in which a gas stream is introduced into the flow channel of the spray device in at least two positions.

7 Claims, 4 Drawing Sheets

Figure 1:
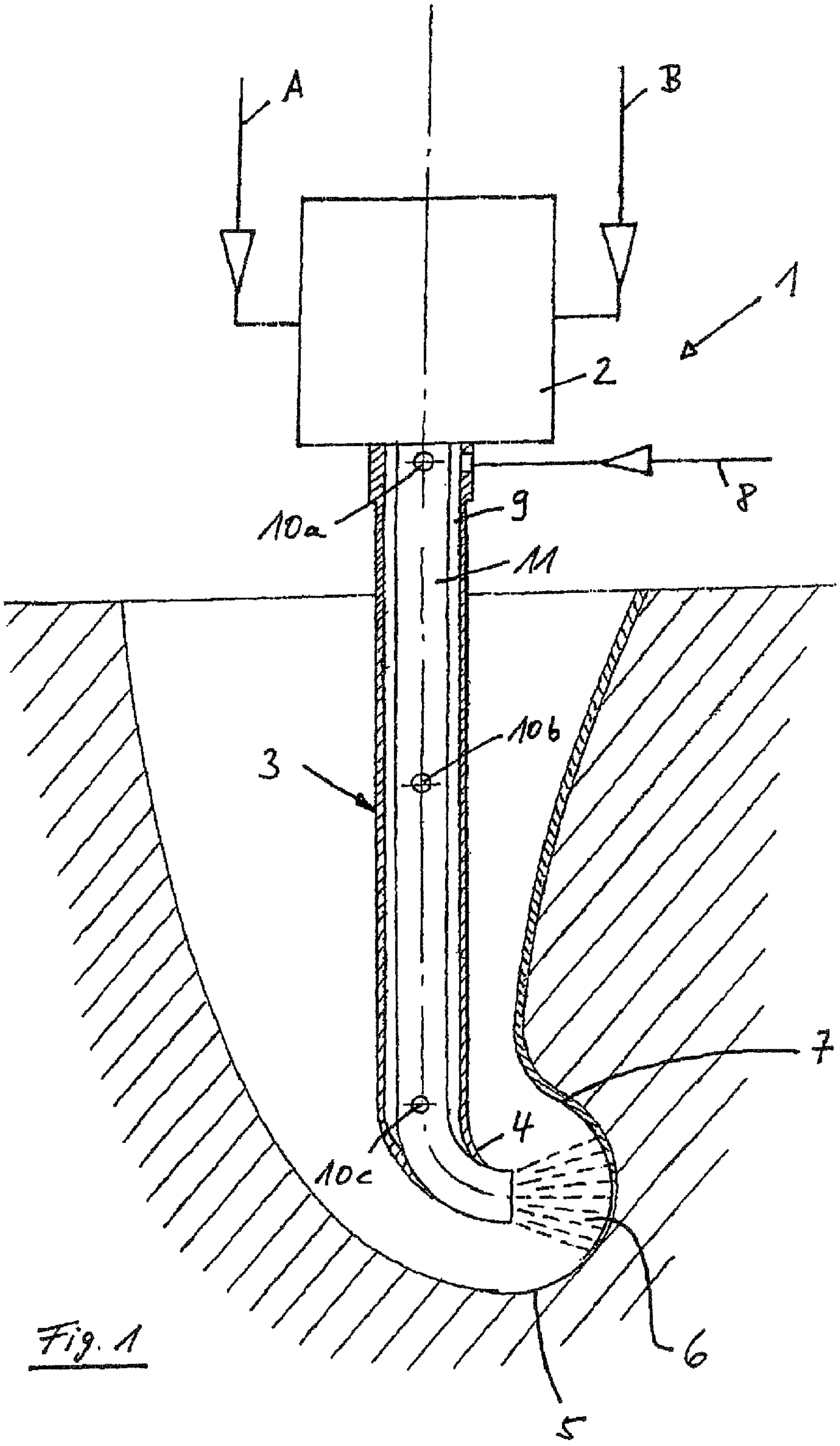

METHOD AND DEVICE FOR THE PRODUCTION OF MOULDED PIECES FROM A LAYER OF POLYURETHANE

This application is a 371 of PCT/EP2008/002635 filed Apr. 3, 2008, which in turn claims the priority of DE 10 2007 016 785.9 filed Apr. 5, 2007, the priority of both applications is hereby claimed and both applications are incorporated by reference herein.

The invention relates to a process and a device for the production of mouldings containing a layer of polyurethane in shot operation, in which a gas stream is introduced into the flow channel of the spray device in at least two positions.

When reactive plastics material, for example polyurethane, is to be applied two-dimensionally to a substrate, spraying has in most cases been a successful application technique. In the case of highly reactive raw material systems, especially in shot operation, so-called high-pressure mixers are used, downstream of which special spray nozzles are provided. An example of such spray systems is described in EP 0303 305 B1.

Because such spray mixing heads are generally guided by a robot, which must execute extremely quick movements, it is very advantageous for such spray mixing heads to be small and accordingly also lightweight.

In the case of three-dimensional spray layers, however, especially in the case of mouldings having narrow cavities and having undercuts, such as, for example, in the case of skin elements for the automotive industry, even miniaturised spray mixing heads come up against limiting factors.

An especially important criterion for an optimal spray process is shot interruptions, because the more complicated a moulding, the more often the mixing head must be re-positioned in order to obtain perfect spray layers having the desired spray layer thickness and optimum surface.

However, after such necessary shot interruptions, the spray system must remain fully functional, that is to say the discharge or spray member must not become clogged with reactive mixture during a shot interruption.

The object was, therefore, to provide a process and a device for the production of mouldings containing a layer of polyurethane in shot operation, in which, with the spray system that is used,

- perfect spray layers can be produced even when there are narrow cavities and undercuts in the moulding,
- the discharge or spray member does not become clogged with reactive mixture during shot interruptions.

The invention relates to a process for the production of mouldings containing a layer of polyurethane in shot operation, in which a) first the reactive components polyol and isocyanate are mixed in a mixing head and then b) the reactive mixture produced in step a) is guided through the flow channel of a spray device and c) the reactive mixture leaving the spray device is sprayed onto the surface of a substrate and cures thereon, characterised in that d) a gas stream is introduced into the flow channel of the spray device in at least two positions, the distance l between those two positions being so chosen that the quotient of the distance l and the diameter d of the flow channel of the spray device $$\left(\frac{l}{d}\right)_{max}$$

is >10, preferably >15, particularly preferably >20.

If a gas stream is introduced in more than two positions, or from more than two supply pipes, the distance l is the distance between the positions or supply pipes that are furthest away from one another.

The spray device can be, for example, a spray lance or a spray nozzle or another suitable device for spraying polyurethane reactive mixture.

Figure 2:
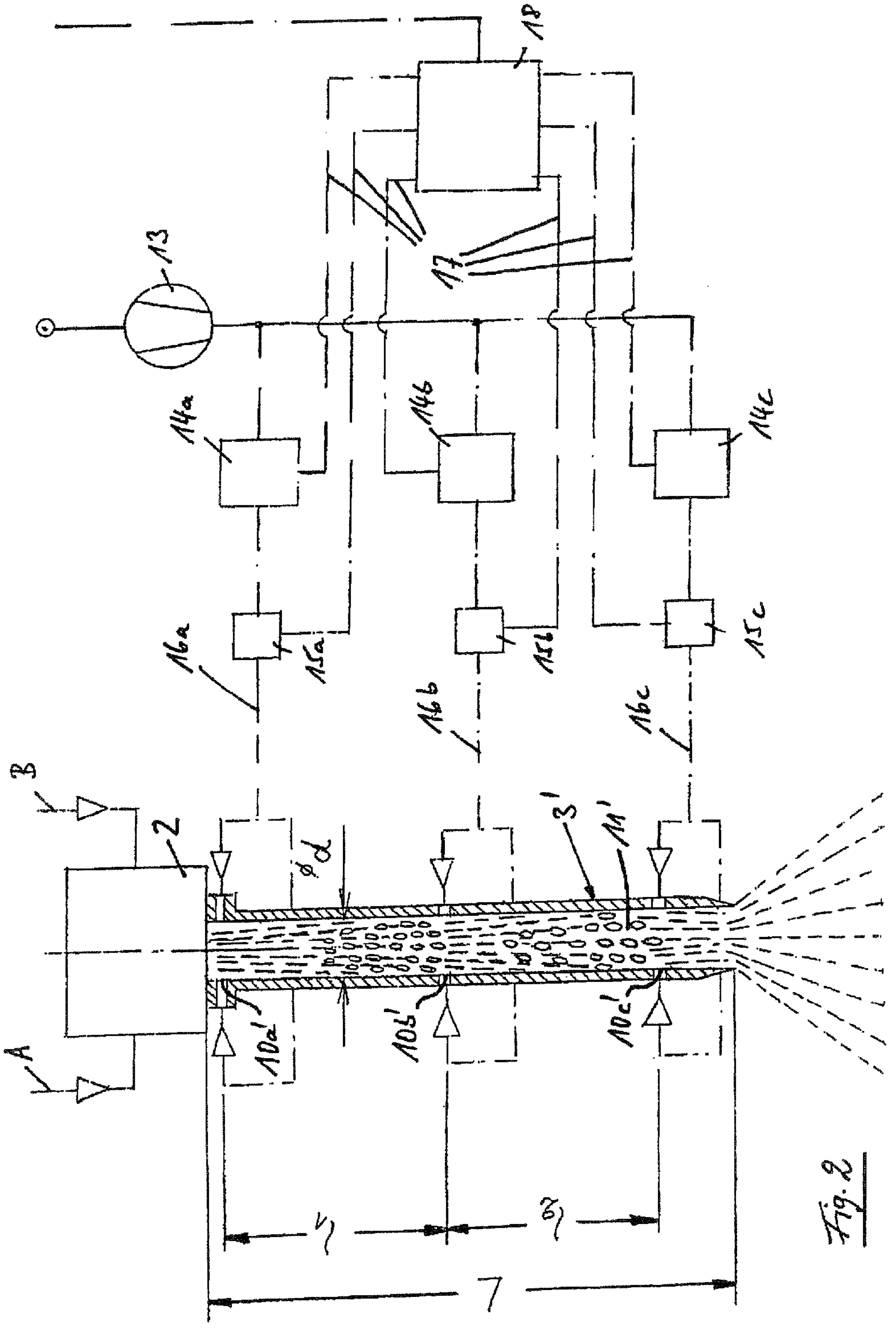
Figure 5:
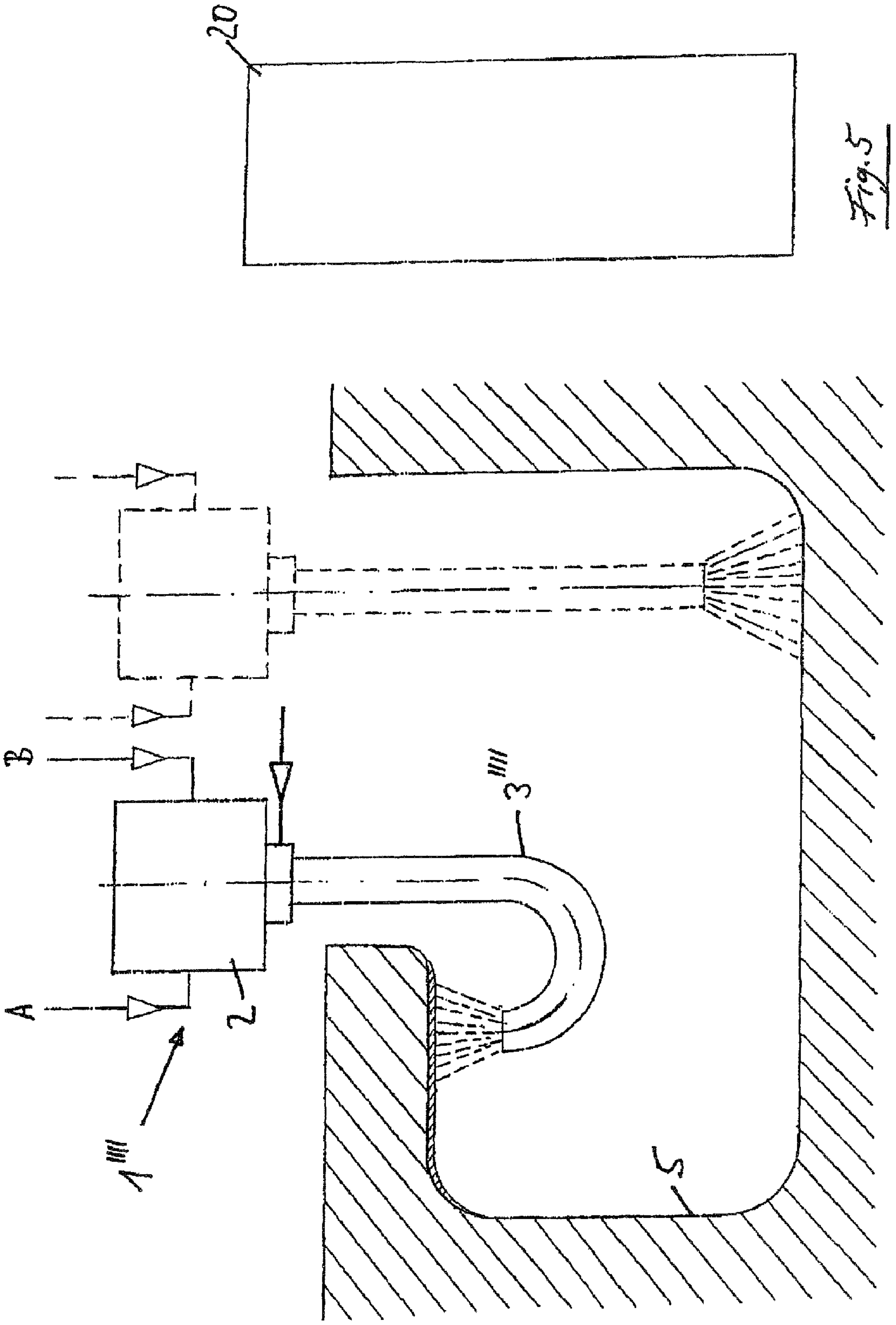

FIGS. 1, 2 and 5 show, by way of example, the solution to the described problem. They illustrate a process for the production of mouldings containing a layer of polyurethane in shot operation. In the process, the reactive components are first mixed in a mixing head and then the reactive mixture so produced is guided through the flow channel of a spray lance (FIG. 2) or spray nozzle (FIGS. 1 and 5), and the reactive mixture leaving the spray lance or spray nozzle is sprayed onto the surface of a substrate, where it cures, a gas stream being introduced into the flow channel of the spray lance or spray nozzle in at least two positions.

With this novel process, the criteria, described in the statement of the object, for the production of mouldings containing a layer of polyurethane in shot operation are achieved fully and completely.

As a result of the design of the discharge member almost arbitrarily as a spray lance or as a spray nozzle, it is possible to produce perfect spray layers even when there are narrow cavities and/or undercuts in a moulding. This can also be seen especially with reference to FIGS. 1 and 5.

The introduction of a gas stream into the flow channel of the spray lance or spray nozzle in at least two positions firstly causes the reactive mixture to be divided into a stream of spray droplets, but also causes the spray droplets to be transported through the flow channel over its entire length. This is preferably achieved by making the gas stream sufficiently large compared with the liquid stream. On the other hand, the gas stream must not be too large because there is then a risk that part of the sprayed-on reaction mixture will be blown away by the strong air stream. The mass ratio of the gas stream that is introduced to the stream of reactive mixture discharged from the mixing head is therefore in a range from 0.002 to 0.1, preferably from 0.004 to 0.05 and particularly preferably from 0.006 to 0.03.

A further important effect of the introduction of gas in at least two positions of the flow channel is that, even in the case of shot interruptions, that is to say when the reactive mixture stops, but the introduction of gas in the at least two positions of the flow channel is maintained, the flow channel is blown free of reactive mixture over its entire length and accordingly remains fully functional for the further spray process.

The fundamental advantage of multi-stage gas introduction is that the two objects

- good spray pattern with good distribution of composition and
- keeping the spray lance clean can be achieved better and substantially more flexibly. In the case of single-stage gas introduction there is the problem, namely in the case of longer spray lances, that the fine droplets which initially form on account of the first gas injection coalesce to form coarser drops again, and that, on the other hand, reaction mixture adheres to the walls in the rear region of the spray lance and the spray lance thus becomes clogged on prolonged operation at least to the extent that the spray jet is impaired. Although both effects can in principle be avoided by increasing the amount of gas at the one injection site, this unfortunately leads to part of the spray layer being blown away by the strong air stream, so that uniform spray application is no longer achieved and the distribution of composition no longer meets the requirements. In the case of a multi-stage gas addition, on the other hand, the combination of these effects can be controlled or optimised considerably better.

However, the advantages of introducing gas in at least two positions of the flow channel are effective only when the two outermost gas injection sites (that is to say the first downstream of the mixing zone and the last before the outlet from the spray device) are at a specific minimum distance from one another. It is of no use if they are very close together, because they then act in principle like a single gas injection by their process-related effect. For that reason, a process-related characteristic number is introduced for defining the minimum distance between the two outermost gas injection sites (that is to say, the first downstream of the mixing zone and the last before the outlet from the spray device). This characteristic number $(l/d)_{max}$ relates the axial distance between the gas injection sites to the inside diameter of the spray device. If the geometry of the flow channel of the spray device differs from that of an uninterrupted, continuous, cylindrical region (e.g. if it is conical or if there is a plurality of cylindrical regions having different diameters), the reference diameter d is calculated from the formula $$d = \sqrt{\frac{4 \cdot V}{\pi \cdot l}}.$$

This corresponds to the diameter which an uninterrupted, continuous, cylindrical region having the same volume and the same length as the actual flow channel would have between the two outermost gas injection sites. In that formula, V corresponds to the volume of the flow channel between the two outermost gas injection sites and l is the distance between the two gas injection sites.

In the further embodiment of this novel process, the first introduction of gas into the flow channel of the spray lance or spray nozzle takes place in the region of the inlet of the reactive mixture into the flow channel and the last introduction of gas takes place in the immediate vicinity of the outlet of the reactive mixture from the flow channel, that is to say the distance of the last gas introduction to the outlet cross-section is preferably approximately from 3 to 50 mm, particularly preferably from 5 to 40 mm and very particularly preferably from 8 to 30 mm.

This measure therefore not only has the effect of keeping the flow channel clean in a particularly effective manner over its entire length; it also permits minimisation of the volume of gas introduced and accordingly an aerosol-free spray jet, that is to say a spray jet with virtually no harmful spray mist. Furthermore, the spray jet with the minimised gas stream has virtually constant distribution of composition over its entire width.

This all has great advantages in terms of production technology:

As a result, the start of spraying, either in the case of the very first shot or after an interruption in shots, can be carried out immediately at the edge of a moulding almost without any losses. Furthermore, single-layer coatings are possible with such spray jets. This in turn brings about minimised use of raw materials and minimised cycle times.

The process can be extended so that further introductions of gas also take place at intermediate positions. Depending on the reactivity of the reactive mixture, this permits spray lance or spray nozzle lengths of up to 1000 mm. The limits set are more chemistry-related than process-related, because the dwell time of the reactive mixture in the mixing and spray system as a whole must, of course, be markedly less than the chemically determined start time of the reactive mixture.

The distance between the individual gas introductions is defined by the process-related characteristic number $$\left(\frac{li}{d}\right) opt.$$

The measure $l_i$ represents the axial distance between two adjacent gas injection sites and the measure d represents the reference diameter in that section. The reference diameter d is again calculated, if the geometry of the flow channel of the spray device differs from that of an uninterrupted, continuous, cylindrical region (e.g. if it is conical or if there is a plurality of cylindrical regions having different diameters), from the formula $$d = \sqrt{\frac{4 \cdot V}{\pi \cdot l}}.$$

This again corresponds to the diameter which an uninterrupted, continuous, cylindrical region having the same volume and the same length as the actual flow channel would have between two adjacent gas injection sites. In that formula, V corresponds to the volume of the flow channel between two adjacent gas injection sites and l is the distance between the two gas injection sites.

Depending on the raw material system used, that characteristic number is in a range from 5 to 100, preferably from 7 to 70 and particularly preferably from 10 to 50. For raw material systems of low activity, a characteristic number of 40 can be used as a starting point as a first estimation, and a characteristic number of 20 can be used as a starting point for more highly active raw material systems. The optimum index can best be determined empirically. Criteria thereby are on the one hand that the spray lance is to be kept clean and on the other hand the quality of the spray application.

Too small a distance results, especially in the case of longer lances, in a large number of very small air inlet openings. However, because the individual air inlet openings are generally fed from only one compressed air reservoir (e.g. the main supply network, optionally with pressure reducing valves arranged downstream), there is a risk that flow through the individual injection sites will be very irregular and that individual holes will become clogged. Although it would theoretically be possible to regulate each individual gas stream individually, this would of course be very complicated in the case of a large number of gas inlet openings. In addition, the effect of a large number of relatively low-impulse gas injection jets in respect of droplet production is poorer than that of a smaller number of more highly impulse-loaded gas injection jets.

Too great an axial distance between the individual injection sites, on the other hand, has the result that too much air must be added in order to keep the lance clean during spraying. However, this has negative effects on the spray application, because the large air stream blows away some of the sprayed-on material so that waves form.

If the introductions of gas into the flow channel of the spray lance or spray nozzle take place tangentially, this further improves the formation of spray droplets and the transportation of the spray droplets, as well as the cleaning of the spray system as a whole.

In a further embodiment of this novel process, the gas streams of the gas introductions can be adjusted or regulated. In this manner, when the mass flow of reactive mixture changes, the gas streams can also be adapted accordingly.

In a special variant, the individual gas streams can be adjusted or regulated separately from one another. This is particularly important because all the gas streams introduced flow together with the spray drops of the reactive mixture through the outlet opening of the flow channel and thereby bring about the outlet speed of the spray jet. This in turn must not only be low-aerosol but also low-impulse, so that the spray layer, which is still liquid after application, is not itself "blown away" by the spray jet.

It is therefore expedient to minimise the total number of all gas introductions, that is to say the total mass flow of gas, and to graduate the individual gas introductions, that is to say, for example, that the gas stream of the first gas introduction must be sufficiently great to divide the reactive mixture flowing into the flow channel into droplets. The gas streams of the further gas introductions can then optionally be markedly smaller. They must only be sufficiently great to prevent the spray droplets from coalescing. The total volume stream of all gas introductions, according to the size of the flow channel and ultimately depending on the discharge capacity of reaction mixture, can be in a range from 5 Nl/min to 200 Nl/min, preferably from 10 Nl/min to 150 Nl/min and particularly preferably from 15 Nl/min to 100 Nl/min. The term 1 Nl (normal liter) thereby means the gas volume of 1 liter at 20° C. and 1.013 bar absolute pressure.

If pressure indicators are installed in the pipes for the gas streams, it is also possible to monitor the operability, that is to say the cleanliness of the flow channel of the spray lance or spray nozzle. If a pressure increase occurs with constant gas flow, that is an indication that fully reacted reactive mixture is adhering to the flow channel.

In principle, it is sufficient to install a pressure indicator in the pipe of the first gas introduction. If, however, a pressure indicator is present in each gas pipe, it is possible to ascertain which region of the flow channel is particularly affected.

Spray layers such as those shown in FIG. 5, for example, cannot be produced with a single spray member. It is necessary during a spraying cycle either to change the spray member, which can be carried out with a spray lance or spray nozzle change-over station, or such a moulding tool is associated with at least two spray mixing heads having corresponding spray members, which spray either simultaneously or alternately depending on the space available.

A particularly effective measure for keeping the flow channel of the spray lance or spray nozzle operative, that is to say clean, is to pulse the gas streams during shot interruptions and especially after the end of a shot, that is to say to allow the gas stream to increase in a pulsed manner beyond the value necessary for the spraying process.

In an advantageous embodiment of the process, the flow channel is divided into a plurality of regions each having different diameters. Here too, the reference diameter d is again calculated from the formula $$d = \sqrt{\frac{4 \cdot V}{\pi \cdot l}}.$$

This again corresponds to the diameter which an uninterrupted, continuous, cylindrical region having the same volume and the same length as the actual flow channel would have between two adjacent gas injection sites. In that formula, V corresponds to the volume of the flow channel between the adjacent gas injection sites and l is the distance between the two gas injection sites.

Figure 4:
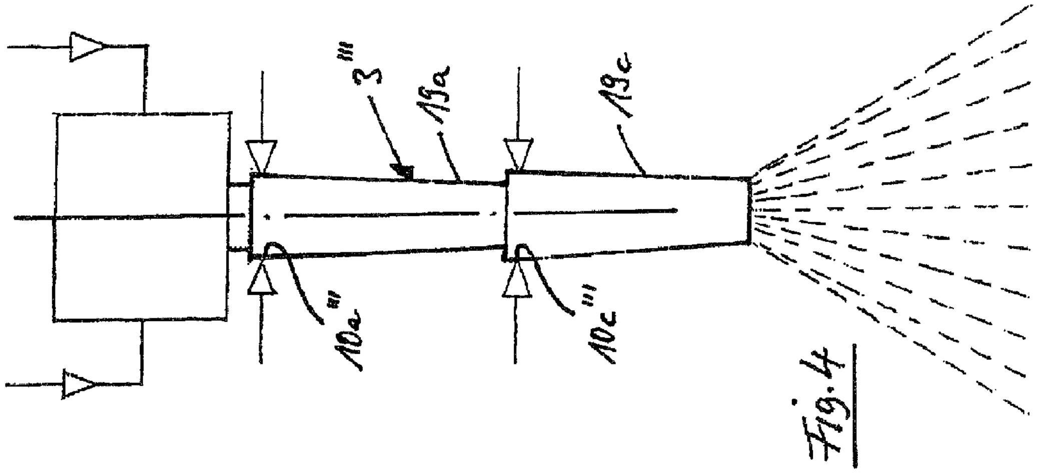

In a particularly advantageous embodiment, the diameter increases from region to region in the direction towards the outlet opening. As a result, it is possible in the first portion of the spray lance to overcome a relatively large distance with a relatively impulse-loaded stream. The impulse is then reduced by the cross-sectional enlargements. Advantageously, as shown in FIG. 4, gas injection sites are arranged downstream of these cross-sectional enlargements, because dead zones in those regions can thus be avoided.

The invention relates also to a device for the production of mouldings containing a layer of polyurethane in shot operation, comprising:

a) storage containers and metering units for the reactive components polyol and isocyanate, b) a mixing head for mixing the reactive components, c) connecting pipes from the storage containers to the metering units and from the metering units to the mixing head, d) a spray device containing a flow channel connected hydraulically to the mixing head, characterised in that it further comprises e) a first supply pipe, arranged in the inlet region of the flow channel, for the introduction of a first gas stream into the flow channel, f) a second supply pipe, arranged in the outlet region of the flow channel, for the introduction of a second gas stream into the flow channel, the first supply pipe and the second supply pipe being arranged at a distance l from one another, so that the quotient of the distance l and the diameter d of the flow channel of the spray device $$\left(\frac{l}{d}\right)_{max}$$

is >10, preferably >15, particularly preferably >20.

If a gas stream is introduced in more than two positions, or from more than two supply pipes, the distance l is the distance between the positions or supply pipes which are furthest away from one another.

The inlet region of the flow channel is understood as being the region located in the region of the first 20% of the overall length of the flow channel, based on the inlet opening of the flow channel facing the mixing head. Correspondingly, the outlet region of the flow channel is understood as being the region located in the region of the last 20% of the overall length of the flow channel, based on the inlet opening facing the mixing head.

The supply of gas into the flow channel is made possible by the provision of a gas source or a compressor and of connecting pipes from the gas source or compressor to the first and second supply pipes into the flow channel.

The spray device can be a spray lance or a spray nozzle or another suitable device for spraying polyurethane reactive mixture.

The mixing heads used in the case of shot operation are so-called high-pressure mixing heads, generally slider-controlled mixing heads, in which the change over from recirculation to shot operation is carried out by means of a control slide, which is simultaneously also the cleaning member for the mixing chamber.

The flow channel of the spray lance or spray nozzle is immediately adjacent to the mixing chamber, the first introduction of a gas stream into the flow channel taking place directly at the start of the flow channel. This has the advantage that, in the case of shot interruptions or at the end of a shot, not only the flow channel but also the end face of the control slide located to the front, that is to say in the cleaning position, can be blow clean by the air blast.

Depending on the raw material system, that is to say depending on the reactivity and viscosity of the reactive mixture, the pressures used in spraying are approximately from 0.2 to 50 bar, preferably from 0.3 to 30 bar, particularly preferably from 0.5 to 10 bar. As a result, it is possible to produce drop sizes markedly below 100 μm even with a relatively long spray channel. The drop size distribution can be determined by measurement using, for example, the Spraytec laser diffraction spectrometer from Malvern.

The pressures used during cleaning by blowing are from 1.0 to 100 bar, preferably from 2.0 to 50 bar, particularly preferably from 3.0 to 20 bar.

The gas used, both for spraying and for cleaning by blowing, is generally compressed air. However, other inert gases, such as, for example, nitrogen, can likewise be used. It is also conceivable, however, especially during cleaning by blowing, to add solids particles or liquid drops to the gas stream in order to ensure the required cleaning effect, for example in the case of extremely highly reactive raw material systems.

The last introduction of a gas stream into the flow channel preferably takes place in the immediate vicinity of the outlet of the reactive mixture from the flow channel of the spray lance or spray nozzle, that is to say approximately from 3.0 to 50.0 mm, preferably from 5.0 to 40.0 mm, particularly preferably from 8.0 to 30.0 mm, before the end of the flow channel.

In the case of spray lance or spray nozzle lengths greater than 200 mm, it is expedient to arrange further gas introductions at intermediate positions between the first and last gas introductions.

If the distance between the individual gas introductions is too great, the spray droplets coalesce, as a result of which the transportation of the spray drops through the flow channel is considerably impaired.

The distance between the individual gas introductions is defined by the process-related characteristic number $$\left(\frac{li}{d}\right)opt.$$

Depending on the raw material system used, this is preferably in a range from 5 to 100, particularly preferably from 7 to 70 and very particularly preferably from 10 to 50. For raw material systems of low activity, a characteristic number of 40 can be used as a starting point as a first estimation, and a characteristic number of 20 can be used as a starting point for more highly active raw material systems.

Depending on the discharge amount, viscosity and reactivity of the reactive mixture, and depending on the required overall length L of the flow channel, the diameter d of the flow channel can be from 2.0 to 30.0 mm, preferably from 3.0 to 20.0 mm, particularly preferably from 4.0 to 10.0 mm.

Which diameter d is ultimately to be chosen can only be determined in a practical test which, according to the raw material system, application amount and flow channel length, is to be carried out only once.

However, a spray lance with a plurality of cylindrical regions each having different diameters is also advantageous. In a particularly advantageous embodiment, the diameter increases from region to region in the direction towards the outlet opening. As a result it is possible in the first portion of the spray lance to overcome a relatively large distance with a relatively impulse-loaded stream. The impulse is then reduced by the cross-sectional enlargements. Advantageously, as shown in FIG. 4, gas injection sites are arranged downstream of the cross-sectional enlargements, because dead zones in those regions can thereby be avoided. Here too, the reference diameter d is again calculated from the formula $$d = \sqrt{\frac{4 \cdot V}{\pi \cdot l}}.$$

This again corresponds to the diameter which an uninterrupted, continuous, cylindrical region having the same volume and the same length as the actual flow channel would have between two adjacent gas injection sites. In that formula, V corresponds to the volume of the flow channel between the adjacent gas injection sites and l is the distance between the two gas injection sites.

The inlet openings for the introduction of gas into the flow channel of the spray lance or spray nozzle can be arranged tangentially. This improves the formation of spray drops and accordingly also the transportation of the spray drops, but also the cleaning of the spray system as a whole. Each injection site can also consist of a plurality of inlet openings, which are then preferably arranged uniformly distributed over the periphery. It is also conceivable for the inlet openings associated with an injection site to be arranged offset slightly axially.

In a further embodiment of the novel device, control members for adjusting the gas volume are arranged in the gas connecting pipes between the gas source and the pipes for supplying the gas streams into the flow channel of the spray lance or spray nozzle. It is thus possible to adapt the gas volume when the discharge amount of reactive mixture changes.

It is further possible to adjust the gas streams of the individual gas connecting pipes stepwise according to process-related requirements, that is to say, for example, that, in the case of two gas connecting pipes, the first receives from 60 to 80% of the total volume stream of gas and the second gas connecting pipe receives approximately from 20 to 40% of the total volume stream of gas. In this manner it is possible to minimise the total gas volume, which in turn brings about low-aerosol and low-impulse spray jets.

If pressure indicators are arranged downstream of the control members, it is possible to monitor the operability, that is to say the cleanliness, of the flow channel of the spray lance or spray nozzle. If a pressure increase occurs with a constant gas stream, this is an indication that fully reacted reactive mixture is adhering to the flow channel.

In a particular embodiment of the novel device, volume controlling valves are used as the control members for adjusting the gas volume, the volume controlling valves and the pressure indicators being connected to a control device by way of impulse pipes (electrical signal lines).

In that manner, it is possible to counteract clogging of the flow channel automatically in the case of an increase in pressure by increasing the gas volume. Of course, this measure has limits, because the gas volume can only be increased so far that the criteria “low-aerosol and low-impulse spray jet”, which are important for the spraying process, are not impaired.

If the control device is also connected to the metering unit via a further impulse pipe (electrical signal line), the gas volume can automatically be adapted accordingly when the discharge amount of reactive mixture changes.

In conjunction with a spray lance or spray nozzle change-over station, even a fully automatic process is then possible. Spray lances or spray nozzles are preferably changed automatically when

- a spray lance or spray nozzle has become too heavily clogged with “baked on” reactive mixture,
- the discharge amount of reactive mixture is changed, for example in the case of spray layers of different thicknesses,
- owing to the special contour of the spray layer, spraying is begun, for example, with a spray nozzle (see also FIG. 5) and must then be changed over to a spray lance.

The invention relates also to the use of mouldings containing a layer of polyurethane that have been produced by means of a process or device as described in this application.

Figure 3:
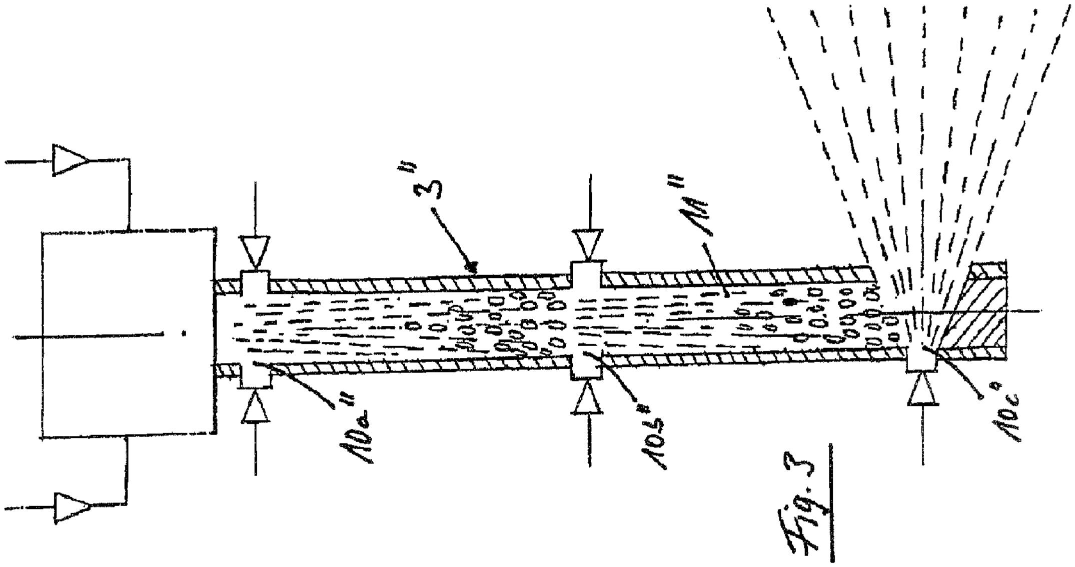

The invention is explained in detail with reference to the following diagrams, in which FIG. 1 shows, in diagrammatic form, a mixing head having a spray nozzle containing a 90° bend, FIG. 2 shows, in diagrammatic form, a spray system with a spray lance, FIG. 3 shows, in diagrammatic form, a special construction of a spray lance, FIG. 4 shows, in diagrammatic form, a further special construction of a spray lance, FIG. 5 shows, in diagrammatic form, a spray system with a spray lance or spray nozzle change-over station.

FIG. 1 shows a device 1 containing a mixing head 2 and, as the spray device, a spray nozzle 3 containing a 90° bend 4 for spraying polyurethane reactive mixture onto a substrate 5. The reactive components polyol A and isocyanate B are conveyed from storage containers, via metering units (not shown in the diagram), by means of connecting pipes, to a high-pressure mixing head 2, where they are mixed with one another. The reactive mixture is then forced through the flow channel of a spray nozzle 3 with a 90° bend 4 and is applied in the form of a spray jet 6 to the substrate 5, which is here the tool surface of a tool having a pronounced cavity and an undercut, that is to say a cavity that is difficult to reach.

The sprayed reactive mixture reacts fully on the tool surface (substrate 5), resulting in the formation of a skin 7, to the back of which foam is subsequently applied in further processing steps (not shown in the diagram) and which can be processed further to form, for example, a moulding for the automotive industry.

In the direction of flow, immediately downstream of the mixing head 2, a gas stream 8 is passed into the annular channel of the spray nozzle 3. The gas then passes from the annular channel 9, via three gas supply pipes 10*a*, 10*b*, 10*c*, into the flow channel 11 of the spray nozzle 3, wherein first the gas stream divides the reactive mixture into spray droplets and then the reactive mixture is guided further to the outlet from the flow channel and is then sprayed.

In FIG. 2, reactive components A and B are likewise conveyed from storage containers, via metering units (not shown in the diagram), by means of connecting pipes, to a high-pressure mixing head 2, where they are mixed with one another. The reactive mixture is then forced through the flow channel 11' of a spray device in the form of a spray lance 3'.

A first introduction of gas, that is to say a first supply pipe 10*a*' arranged in the inlet region of the flow channel 11', into the flow channel 11' of the spray lance 3' takes place immediately downstream of the mixing head 2. As a result, the reactive mixture is divided into spray droplets and conveyed in the direction of the outlet from the flow channel.

Because the spray droplets tend to coalesce as they flow through the flow channel, a second introduction of gas through the supply pipe 10*b*' takes place at a distance $l_1$, as a result of which the coalescing of the spray droplets is counteracted.

At a further distance $l_2$, the third, and in this example final, introduction of gas 10*c*' takes place through the supply pipe 10*c*' arranged in the outlet region of the flow channel 11', likewise with the aim of counteracting coalescence. In this manner, a cascade of gas additions forms over the entire length L of the flow channel, producing a finely divided gas/liquid dispersion, which then leaves the flow channel 11' of the spray lance 3' as a spray jet. In this manner, a drop spectrum with drop sizes below 100 μm can be achieved even with relatively long flow channels.

FIG. 2 further shows a compressor 13 connected to a gas source, from which compressor 13 gas pipes 16*a*, 16*b*, 16*c* lead, via volume controlling valves 14*a*, 14*b*, 14*c* and pressure indicators 15*a*, 15*b*, 15*c*, to the gas supply pipes 10*a*', 10*b*', 10*c*'. The pressure indicators 15*a*, 15*b*, 15*c* and the volume controlling valves 14*a*, 14*b*, 14*c* are connected via impulse pipes 17 to a control device 18.

The control device is connected via a further impulse pipe 19 to the metering machine (not shown in the diagram) for the reactive components A and B. In that manner, the gas streams introduced into the flow channel of the spray lance can be adapted automatically when the discharged amount of reactive mixture changes.

It is further possible, by means of the pressure indicators 15*a*, 15*b*, 15*c*, to monitor the condition of the flow channel 11'. If the flow channel 11' becomes increasingly clogged with fully reacted reactive mixture, the gas stream can be increased in order to counteract clogging. However, the gas stream can only be increased to such an extent that the spray jet is not impaired thereby, because the spray jet must remain low-aerosol and low-impulse in order to allow the production of perfect spray layers. If too much reactive mixture has become caked in the spray channel 11', the spray lance 3' must be changed. This can be carried out fully automatically in conjunction with the spray lance/spray nozzle change-over station shown in diagrammatic form in FIG. 5.

By means of the pressure indicators it is also possible to determine which region of the spray lance 3' of the spray channel 11' has increased caking of reactive mixture. If the increased caking is in the end region of the flow channel 11', then the pressure increases at all three pressure indicators. If the increased caking is only in the upper region of the flow channel 11', the pressure increases only at the pressure indicator 15*a* for the first gas supply pipe 10*a*'.

In the case of shot interruptions or after the end of a shot, the mixing head switches the reactive components to recirculation, as a result of which the metering operation is ended.

The spraying operation is maintained for a short time until the flow channel has been blown completely clear.

The mixing head 2 with the spray lance 3' is then pivoted into a cleaning position and the gas stream is automatically increased by the volume controlling valves 14a, 14b, 14c, whereby final residues of reactive mixture are blown out of the flow channel 11' in a cleaning station. The aerosols formed thereby are removed by an exhaust device.

FIG. 3 shows a special construction of a spray lance 3" with the following particular features:

The gas supply pipes 10a", 10b", 10c" into the flow channel 11" are carried out via channels arranged annularly around the flow channel. This effects optimum spray droplet formation and also completely uniform spray drop flow that is undisrupted, that is to say free of dead space. Furthermore, cleaning of the flow channel of the spray lance is also promoted by the inflow of gas via the channels.

Deflection of the spray mist through 90° in the region of the outlet of the spray channel 11" is carried out by a particularly simple construction, which also permits the spraying of undercuts, in the case of extremely narrow cavities, or even the inside surface of a tube.

FIG. 4 shows a relatively short spray lance 3'" having a length of approximately from 100 to 200 mm, with only two gas supply pipes (10a'", 10c'").

The particular feature of this embodiment is, however, that the flow channel is divided into sections 19a, 19c, which taper conically (approximately from 1° to 5°) in the direction of flow.

Firstly, this arrangement is a special variant, in terms of its mode of action, for inflow as shown in FIG. 3.

However, the conicity also effects a particularly broad spray jet, especially in the case of tangential inflow of the gas introductions.

FIG. 5 shows, in diagrammatic form, a mixing head 2 with a spray nozzle 3"" equipped with a 180° arch. This is necessary in this particular case because part of the surface to be coated (substrate 5) is in a tool cavity.

The gas introductions into the flow channel of the spray nozzle 3"" take place in this example, as shown in FIG. 1, by means of an annular channel (not shown in FIG. 5) arranged around the flow channel.

The spray device 1"" shown in diagrammatic form in FIG. 5 also has an associated spray lance or spray nozzle change-over station 20, which allows spray nozzles or spray lances to be changed during the entire spraying process, which is necessary in this particular example because almost every surface requires a separate spray nozzle or spray lance.

It is also conceivable to use two mixing heads in this specific example, which operate simultaneously or alternately. This saves at least the time that is required with only one mixing head for changing a spray lance or spray nozzle.

The spray lance or spray nozzle change-over station shown in diagrammatic form in FIG. 5, in conjunction with the spraying station shown in FIG. 2, permits a fully automatic spraying process.

The invention claimed is:

1. Process for the production of mouldings containing a layer of polyurethane in shot operation, comprising a) mixing reactive components of polyol and isocyanate in a mixing head and then b) guiding the reactive mixture produced in step a) through a flow channel of a spray device, c) spraying the reactive mixture leaving the spray device onto a surface of a substrate such that the reactive mixture cures thereon, d) introducing a gas stream into the flow channel of the spray device in two positions, the distance l between those two positions being so chosen that the quotient of the distance l and the diameter d of the flow channel of the spray $$\left(\frac{l}{d}\right)_{max}$$

is >10, e) the guiding step comprises (1) forming droplets of the reactive mixture in the flow channel, and (2) transporting the droplets through the flow channel, and f) maintaining the gas stream in the flow channel after the reactive mixture has been sprayed in step (c) in order to clean out the flow channel.

2. Process according to claim 1, wherein the first gas introduction takes place through a first supply pipe arranged in an inlet region of the flow channel and the second gas introduction takes place through a second supply pipe arranged in an outlet region of the flow channel.

3. Process according to claim 1, wherein a gas stream is introduced into the flow channel of the spray device in more than two positions.

4. Process according to claim 1, wherein the introduction of gas into the flow channel takes place tangentially.

5. Process according to claim 1, wherein the flow channel has a plurality of cylindrical regions having different diameters.

6. Process according to claim 5, wherein the diameter of the flow channel increases in the direction towards the outlet opening.

7. Process according to claim 6, wherein a supply pipe for the introduction of a gas stream is arranged immediately downstream of a cross-sectional widening.

* * * * *